(12) United States Patent
Lafargue et al.

(10) Patent No.: US 10,458,341 B2
(45) Date of Patent: Oct. 29, 2019

(54) TURBOSHAFT ENGINE FOR AN AIRCRAFT EQUIPPED WITH AN AUTOMATICALLY-ACTIVATED CENTRALISER

(71) Applicant: SAFRAN HELICOPTER ENGINES, Bordes (FR)

(72) Inventors: Olivier Lafargue, Moissy-cramayel (FR); Sébastien Brotier, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 72 days.

(21) Appl. No.: 15/568,742

(22) PCT Filed: Apr. 26, 2016

(86) PCT No.: PCT/FR2016/050976
§ 371 (c)(1),
(2) Date: Oct. 23, 2017

(87) PCT Pub. No.: WO2016/174340
PCT Pub. Date: Nov. 3, 2016

(65) Prior Publication Data
US 2018/0298827 A1    Oct. 18, 2018

(30) Foreign Application Priority Data

Apr. 27, 2015 (FR) ..................... 15 53752

(51) Int. Cl.
*F02C 7/36* (2006.01)
*B64C 27/12* (2006.01)
(Continued)

(52) U.S. Cl.
CPC .............. *F02C 7/36* (2013.01); *B64C 27/12* (2013.01); *B64D 35/02* (2013.01); *F01D 15/12* (2013.01);
(Continued)

(58) Field of Classification Search
CPC ...... F02C 7/36; F02C 7/32; F02C 3/10; B64C 27/04; B64D 35/00; B64D 35/02; F01D 15/12; F05D 2220/329; F05D 2230/68; F05D 2260/4031; F05D 2260/52; F16H 57/02; F16H 2057/02043; Y02T 50/671
See application file for complete search history.

(56) References Cited

U.S. PATENT DOCUMENTS 4,685,550 A * 8/1987 Metcalf ................. F16D 27/118
                                                   192/101
5,271,295 A * 12/1993 Marnot .................... B64C 27/14
                                                   244/58
(Continued)

FOREIGN PATENT DOCUMENTS

FR           2 756 542 A1    6/1998

OTHER PUBLICATIONS

International Search Report and Translation dated Jul. 6, 2016, issued in corresponding International Application No. PCT/FR2016/050976, filed Apr. 26, 2016, 5 pages.
(Continued)

*Primary Examiner* — Jason D Shanske
*Assistant Examiner* — Eric J Zamora Alvarez
(74) *Attorney, Agent, or Firm* — Christensen O'Connor Johnson Kindness PLLC

(57) ABSTRACT

A turboshaft engine includes a casing in which is arranged a gas generator and a free turbine fitted to a power shaft. The power shaft is configured to be mechanically connected to/disconnected from a reduction gearbox.
The turboshaft engine includes at least one centralizer movable between an active position, in which the centralizer forms a bearing for the power shaft and which corresponds to a mechanical disconnection between the power shaft and the reduction gearbox, and a passive position, in which the centralizer is distanced from the power shaft and which corresponds to a mechanical connection between the power shaft the reduction gearbox.

8 Claims, 2 Drawing Sheets

(51) Int. Cl.
*B64C 35/02* (2006.01)
*F02C 3/10* (2006.01)
*F01D 15/12* (2006.01)
*F16H 57/02* (2012.01)
*B64D 35/02* (2006.01)

(52) U.S. Cl.
CPC .......... *F02C 3/10* (2013.01); *F05D 2220/329* (2013.01); *F05D 2230/68* (2013.01); *F05D 2260/4031* (2013.01); *F05D 2260/52* (2013.01); *F16H 57/02* (2013.01); *F16H 2057/02043* (2013.01); *Y02T 50/671* (2013.01)

(56) References Cited

U.S. PATENT DOCUMENTS

| | | | |
|---|---|---|---|
| 6,019,313 A | 2/2000 | Lenhart et al. | |
| 7,144,349 B2 * | 12/2006 | Mitrovic | B64D 35/00 475/331 |
| 2013/0089409 A1 * | 4/2013 | Bedrine | B64C 27/12 415/122.1 |
| 2013/0315714 A1 | 11/2013 | Müller | |
| 2014/0127000 A1 * | 5/2014 | Abousleiman | F02C 7/32 415/124.1 |

OTHER PUBLICATIONS

Written Opinion of the International Searching Authority dated Jul. 6, 2016, issued in corresponding International Application No. PCT/FR2016/050976, filed Apr. 26, 2016, 5 pages.
International Preliminary Report on Patentability dated Oct. 31, 2017, issued in corresponding International Application No. PCT/FR2016/050976, filed Apr. 26, 2016, 1 page.

* cited by examiner

TURBOSHAFT ENGINE FOR AN AIRCRAFT EQUIPPED WITH AN AUTOMATICALLY-ACTIVATED CENTRALISER

TECHNICAL FIELD OF THE INVENTION

The invention relates to turboshaft engines for aircraft, in particular turboshaft engines comprising a free turbine of which one of the bearings is moved into a reduction gearbox.

TECHNOLOGICAL BACKGROUND

A turboshaft engine comprises, in a known manner, a gas generator and a free turbine fitted to a shaft, known as a power shaft. This power shaft is configured so that it can be connected mechanically to a reduction gearbox. This reduction gearbox is, for example, in the case of a helicopter, a power transmission gearbox connected to the rotor(s) of the helicopter. When the power shaft of the free turbine and the reduction gearbox are mechanically connected, the power of the power shaft is transmitted to the power transmission gearbox, which allows the rotor(s) of the helicopter to be driven in rotation.

The power shaft of the free turbine is driven in rotation by the free turbine, which receives the gases produced by the gas generator and which reduces their pressure, which allows the kinetic energy of the gases received to be transformed into a mechanical energy recovered by the power shaft.

The power shaft therefore comprises two ends, an end known as the power end, which is configured to be connected to the reduction gearbox, and an opposite end, known as the free end, which typically carries the blades of the free turbine.

In addition, the current trend is to design turboshaft engines that can be fitted directly into reduction gearboxes. A turboshaft engine of this kind that can be integrated is configured so that it can be mounted directly on the reduction gearbox and held by this reduction gearbox. The mechanical connection between the power shaft and the reduction gearbox is therefore an embedded connection. This embedding may be vertical, horizontal or oblique. This functionality allows a significant saving in mass over the entire drive train of the aircraft. A turboshaft engine that can be integrated also has the advantage that it can be removed without difficulty from the reduction gearbox, for example for maintenance operations on the turboshaft engine.

In this context, the intention is to move the bearings for the power end of the power shaft directly into the reduction gearbox. This particular arrangement allows the axial length of the drive train formed by the turboshaft engine and the reduction gearbox to be minimised. In addition, this connection between the engine and the reduction gearbox is simplified by the elimination of the transmission system: gimbal and "flectors" or "Bendix" type system.

One of the technical problems that results from this arrangement of the bearing for the power end of the power shaft in the reduction gearbox is that the power shaft is no longer held by its power bearing when it is not fitted into the reduction gearbox. Consequently, in all situations where the turbine engine is not fitted into the reduction gearbox—for example, during transport of the turboshaft engine from a manufacturing or maintenance site to a site for fitting of the turboshaft engine to the aircraft, during storage of the turboshaft engine, etc.—there is a risk that the sealing systems and rolling bearings of the turboshaft engine will be impaired through radial oscillation of the shaft. For example, a radial oscillation of the shaft may produce damage to a dynamic-seal type of sealing system that has a carbon ring or lip seal. This absence of holding may also cause a rotor-stator contact in the case of a labyrinth seal fed by an air system, for example through a contact between a labyrinth tooth in radial contact with the non-held power shaft.

AIMS OF THE INVENTION

The invention aims to provide, in at least one embodiment of the invention, a turboshaft engine that overcomes at least some of the technical problems encountered by turboshaft engines of the prior art.

The invention also aims to provide, in at least one embodiment of the invention, a turboshaft engine that can be fitted into a reduction gearbox and that is unlikely to suffer damage to its sealing systems and/or rolling bearings, including when the turboshaft engine is mechanically separated from the reduction gearbox.

The invention also aims to provide, in at least one embodiment, an embeddable turboshaft engine that allows the bearing of the power end of the power shaft to be held, including when the turboshaft engine is mechanically separated from the reduction gearbox.

The invention also aims to provide, in at least one embodiment, an aircraft, in particular a helicopter, equipped with at least one turboshaft engine according to the invention.

SUMMARY OF THE INVENTION

In order to do this, the invention relates to a turboshaft engine comprising a casing in which is arranged a gas generator and a free turbine fitted to a power shaft configured to be capable of being mechanically connected to/disconnected from a reduction gearbox.

A turboshaft engine according to the invention is characterised in that it comprises at least one centraliser movable between a position, known as the active position, in which it forms a bearing for said power shaft, and which corresponds to a mechanical disconnection between said power shaft and said reduction gearbox, and a position, known as the passive position, in which it is distanced from said power shaft, and which corresponds to a mechanical connection between said power shaft and said reduction gearbox.

A turboshaft engine according to the invention is therefore equipped with a movable centraliser adapted to be placed in an active position, in which it forms a bearing for the power shaft, which allows the turboshaft engine to self-hold the power shaft when it is separated from the reduction gearbox. In addition, when the power shaft is mechanically connected to the reduction gearbox, the movable centraliser is in the passive position in which it is radially distanced from the power shaft so as to release this shaft from any mechanical constraint.

A turboshaft engine according to the invention is therefore specifically intended to form a turboshaft engine capable of being fitted into a reduction gearbox.

An embeddable turboshaft engine of this kind therefore comprises at least one centraliser movable between the active position, in which the centraliser forms a bearing for said power shaft when said turboshaft engine is separated from said reduction gearbox, and which corresponds to a mechanical disconnection between said power shaft and said reduction gearbox, and the passive position, in which the centraliser is distanced from said power shaft when said turboshaft engine is fitted to said reduction gearbox, and which corresponds to a mechanical connection between said power shaft and said reduction gearbox.

Therefore, in all situations in which the turboshaft engine is not fitted to the reduction gearbox—storage of the turboshaft engine, fitting/removal of the turboshaft engine, transport of the turboshaft engine, etc.—the power shaft of the free turbine is held in position by the movable centraliser, which is then in the active position and forms a bearing for the power shaft.

In practice, the power shaft comprises at least one bearing in the vicinity of each of its ends. The end in the vicinity of the reduction gearbox is known as the power end and the other end is known as the free end. The bearing for the free end is formed by a bearing housing situated on the casing of the turboshaft engine. The bearing for the power end is formed by the movable centraliser in the active position. Once fitted into the reduction gearbox, the bearing is formed directly by the reduction gearbox, which then takes the place of the bearing formed by the movable centraliser in the active position.

Advantageously and according to the invention, at least one movable centraliser—preferably each movable centraliser—is configured so that it can pass automatically from said active position to said passive position during connection of said power shaft to said reduction gearbox, and so that it can pass automatically from said passive position to said active position during disconnection of said power shaft from said reduction gearbox.

According to this advantageous variant, the transition from the passive position to the active position is automatic and concomitant with the mechanical separation of the reduction gearbox and the power shaft, and the transition from the active position to the passive position is automatic and concomitant with the fitting of the turboshaft engine to the reduction gearbox.

As this transition from the active position to the passive position and vice versa is automatic, the fitting of a turboshaft engine to, or its removal from, a reduction gearbox requires less vigilance in comparison with a turboshaft engine not fitted with the movable centraliser. This is because the movable centraliser forming a bearing for the power shaft positions itself automatically during removal of the turboshaft engine, and the centraliser releases the shaft automatically when the turboshaft engine is fitted to the reduction gearbox. The manipulation of a turboshaft engine according to this variant of the invention is therefore particularly easy for an operator during operations to fit/remove the turboshaft engine.

Advantageously and according to the invention, at least one movable centraliser—preferably each movable centraliser—comprises a conical guide ramp with an axis parallel to the axis of said power shaft, and of the same shape as a conical portion of said casing, so that the sliding of said guide ramp on said conical portion of said casing radially displaces said movable centraliser relative to said power shaft.

According to this variant, the movable centraliser comprises a conical guide ramp of the same shape as a conical portion of the casing of the turboshaft engine. As the axis of this guide ramp is parallel to the axis of the power shaft, the slope of the ramp is inclined relative to the axis of the power shaft. Therefore, the sliding of the centraliser on the conical portion of the casing leads to a displacement of the centraliser relative to the power shaft, from the active position to the passive position and vice versa, depending on the direction of displacement of the centraliser relative to the conical portion of the casing.

Advantageously, a turboshaft engine according to the invention comprises at least one spring fitted perpendicularly to said power shaft, between said casing and a movable centraliser, and at least one axial spring extending between said casing and this movable centraliser, said springs being fitted so that they are fixed relative to the casing and slideable relative to the movable centraliser, and being configured so that they can exert a resultant force that opposes the spontaneous sliding of said guide ramp on said conical portion of said casing towards said casing.

According to another variant, these springs are replaced by other equivalent resilient means.

According to a further variant, the springs or resilient means are inclined relative to the axis of the power shaft.

According to these different variants, the springs (or equivalent resilient means) oppose the spontaneous sliding of the guide ramp on the conical portion towards the casing. In other words, in the absence of an external constraint, the conical ramp of the centraliser is not in contact with the conical portion of the casing. In the absence of an external constraint, the springs push the movable centraliser back towards the power shaft, so that it can form a bearing for the power shaft. As the springs are fitted slideably along the movable centraliser and fixedly in relation to the casing, each spring displaces the movable centraliser in a preferred direction without constraining the displacement of the centraliser in a perpendicular direction. The combination of the displacements forms the displacement along the guide ramp.

Conversely, if an external force is exerted on the centraliser towards the casing, the guide ramp slides on the conical portion of the casing and so moves radially away from the power shaft.

For that purpose, advantageously and according to the invention, a movable centraliser has a stop extending in a plane perpendicularly to the axis of said power shaft opposite a bearing surface of the reduction gearbox, so that the mechanical connection between said power shaft and said reduction gearbox produces a mechanical contact between said bearing surface and said stop that leads, through compression of said springs, to said centraliser sliding on said conical portion of said casing, from said active position in which it forms a bearing for the power shaft, to said passive position in which it is distanced from the shaft.

According to this variant, the contact between the bearing surface of the reduction gearbox and the stop of the movable centraliser, which results from the fitting of the turboshaft engine to the reduction gearbox, automatically leads to the centraliser sliding on the conical portion of the casing and therefore to the movable centraliser being distanced from the power shaft. The movable centraliser thus passes automatically into the passive position. Conversely, as soon as the turboshaft engine is separated from the reduction gearbox, the stop of the centraliser is no longer constrained by the reduction gearbox, and the springs therefore push the centraliser back towards the power shaft, thus forming a support bearing for the shaft.

Advantageously and according to the invention, at least one movable centraliser—preferably each movable centraliser—has a concave surface of contact with said power shaft so that it at least partially surrounds said shaft in the active position.

According to another variant, at least one movable centraliser has a convex surface of contact with said power shaft.

Advantageously, a turboshaft engine according to the invention comprises at least two movable centralisers arranged around said power shaft.

The invention also relates to an aircraft, in particular a helicopter, comprising at least one turboshaft engine according to the invention.

The invention also relates to a turboshaft engine and an aircraft equipped with a turboshaft engine, these being characterised in combination by all or some of the features mentioned above or below.

LIST OF DRAWINGS

Other aims, features and advantages of the invention will become apparent on reading the description that follows, given solely as a non-restrictive description and with reference to the accompanying drawings in which.

DETAILED DESCRIPTION OF AN EMBODIMENT OF THE INVENTION

For the purposes of illustration and clarity, the figures are not drawn strictly to scale or in proportion. In the whole of the detailed description that follows with reference to the drawings, except where otherwise indicated, each element of the turboshaft engine is described as it is arranged when the turboshaft engine is in a position in which it is fitted horizontally to a reduction gearbox. This arrangement is shown, in particular, in FIG. 1. Furthermore, the word "axial" relates to locations along the central axis X'X of the turboshaft engine. The word "radial" relates to locations perpendicular to this central axis. Lastly, where elements in different drawings have the same reference signs, these elements are identical.

Figure 1:
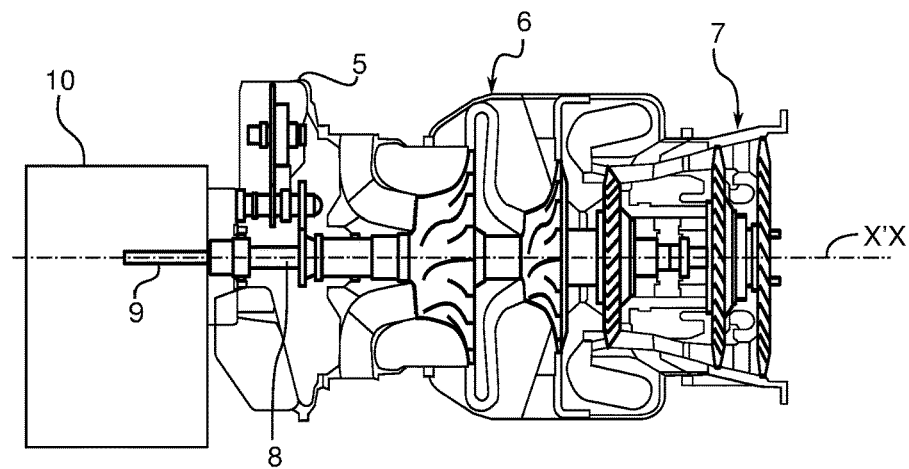
FIG. 1 is a diagrammatic view in cross section of a turboshaft engine fitted into a reduction gearbox.

As shown in FIG. 1, a turboshaft engine according to the invention comprises a casing 5 in which are fitted a gas generator 6 and a free turbine 7. The free turbine 7 is integral with a power shaft 8. According to the embodiment in the drawings, the power shaft 8, which carries the free turbine 7 and which allows the turboshaft engine to be connected to a reduction gearbox 10, passes inside the shaft of the gas generator so that the power end 9 of the power shaft is on the gas generator side. The gas generator 6 and its operation are not described in detail and are well known to persons skilled in the art. It will be appreciated that the invention also applies to a turboshaft engine, the power shaft of which does not traverse the gas generator and the power end of which is therefore opposite the gas generator.

The power shaft 8 extends in the direction X'X of the turboshaft engine. The power shaft 8 is in addition configured so that it can be connected to a reduction gearbox 10 such as a power transmission gearbox of a helicopter. The mechanical connection between the power shaft 8 and the reduction gearbox 10 is not shown in detail in the drawings. The reduction gearbox 10 comprises, for example, a first stage equipped with a drive pinion 20 adapted to engage with a pinion integral with the power shaft 8 in the vicinity of its power end 9.

A turboshaft engine according to the invention further comprises a movable centraliser 12. The centraliser 12 is carried by the casing 5 and can move from a position known as the active position, in which it forms a bearing for the power shaft 8, to a position known as the passive position, in which it is distanced from the power shaft 8.

Figure 2:
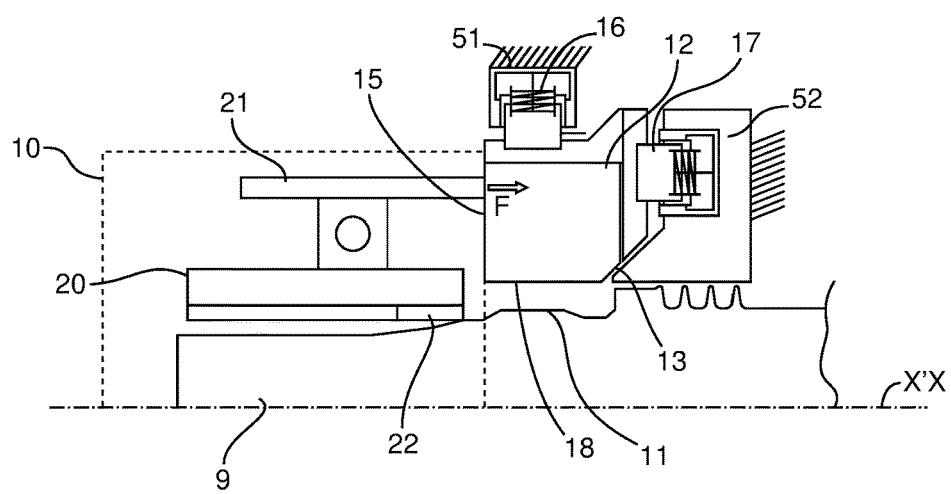
FIG. 2 is a diagrammatic view in cross section of a detail of a turboshaft engine according to an embodiment of the invention in which the centraliser is in the passive position.
Figure 3:
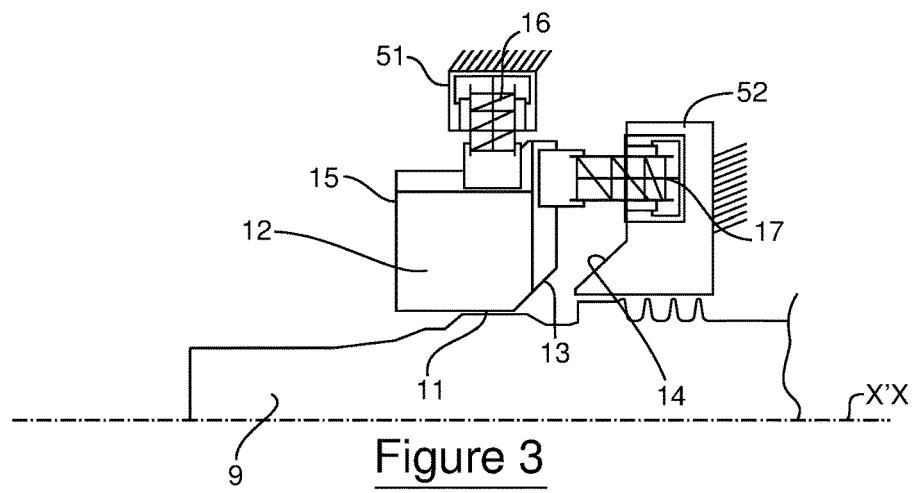
FIG. 3 is a diagrammatic view in cross section of a detail of a turboshaft engine according to an embodiment of the invention in which the centraliser is in the active position.

FIG. 2 shows the centraliser 12 in the passive position and FIG. 3 shows the centraliser 12 in the active position.

The centraliser 12 is configured and fitted to the casing 5 so that the active position corresponds to a disconnection between the power shaft 8 and the reduction gearbox 10 and the passive position corresponds to a mechanical connection between the power shaft 8 and the reduction gearbox.

In order to do this, the movable centraliser 12 comprises a conical guide ramp 13 with an axis parallel to the axis X'X of the power shaft 8. This ramp 13 is of the same shape as a conical portion 14 of the casing 5 so that a force F, with an axis parallel to the axis X'X, exerted on the movable centraliser towards the casing 5 can lead to a displacement of the movable centraliser 12 that distances it radially from the power shaft 8. This radial displacement is obtained through sliding of the guide ramp 13 on the conical portion 14 of the casing 5.

This force F with axis parallel to the axis X'X is produced by the contact between an element of the reduction gearbox 10, such as, for example, the stator 21 of the drive pinion 20 of the reduction gearbox 10, and a stop 15 of the movable centraliser that extends in a plane perpendicularly to the axis X'X. This contact between the stator 21 of the drive pinion of the reduction gearbox 10 and the stop 15 of the movable centraliser 12 results from the embedding of the turboshaft engine in the reduction gearbox. In other words, when the turboshaft engine is fitted to the reduction gearbox, the contact between the stator 21 and the stop 15 happens automatically, which allows the force F with axis X'X to be generated, and therefore allows the movable centraliser 12 to be displaced towards the passive position in which it is radially distanced from the power shaft 8.

The turboshaft engine also comprises, according to an advantageous embodiment shown in FIGS. 2 and 3, a radial spring 16, fitted between an axial portion 51 of the casing 5 and the movable centraliser 12, and an axial spring 17 fitted between a radial portion 52 of the casing 5 and the movable centraliser 12. According to the embodiment shown in the drawings, the radial portion 52 of the casing 5 is the extension of the conical portion 14 of the casing 5. Each spring has an extremity that is fixed relative to the casing and another extremity that is slideable relative to the movable centraliser.

These springs therefore allow the formation of a resultant force that opposes the spontaneous sliding of the movable centraliser 12 on the conical portion 13 of the casing 5, towards the conical portion 13 of the casing 5.

In FIG. 2, the springs 16, 17 are compressed by the action of the force F. The movable centraliser 12 is therefore displaced into its passive position in which it is radially distanced from the power shaft 8 and is not in mechanical interaction with the power shaft 8. In this position, the bearing for the power end 9 of the power shaft 8 is formed directly by the reduction gearbox 10. In particular, the centring of the power shaft 8 is produced directly by the contact between the drive pinion 20 of the reduction gearbox 10 and the extremity 9 of the power shaft. The contact between the pinion 20 and the power shaft 8 is represented diagrammatically in FIG. 2 by the reference 22.

In FIG. 3, the turboshaft engine is separated from the reduction gearbox 10. In this situation, the force F has therefore disappeared, so that the springs 16, 17 could relax in order to push the movable centraliser 12 back from the casing 5. The movable centraliser 12 is therefore in its active position in which it is in contact with the power shaft 8. This contact is made at a contact surface 18 of the movable centraliser 12 and at a centring seat 11 of the power shaft 8. When the contact surface 18 of the movable centraliser 12 is in contact with the centring seat 11 of the power shaft 8, the movable centraliser 12 forms a support bearing for the power shaft 8. In FIG. 3, the movable centraliser 12 bears forcibly against the centring seat 11, which allows a bearing to be formed for the power shaft 8. The power shaft 8 is thus self-held. It involves the active position of the movable centraliser 12.

According to an advantageous embodiment, the contact surface 18 of the movable centraliser 12 is concave so that the centraliser at least partially surrounds said power shaft 8 in the active position. This allows the holding of the power shaft 8 by the movable centraliser 12 in the active position to be improved.

Figure 4:
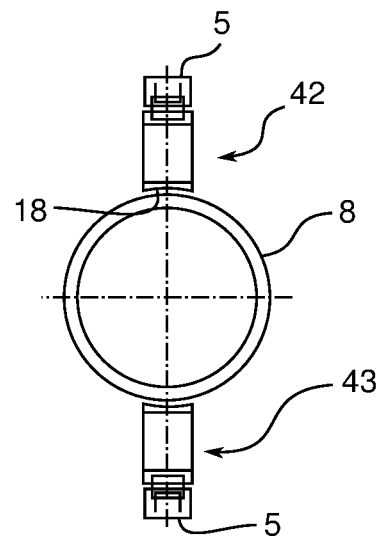
FIG. 4 is a diagrammatic view in cross section of a detail of a turboshaft engine according to an embodiment of the invention equipped with two movable centralisers.

According to an advantageous embodiment shown in FIG. 4, the turboshaft engine comprises two movable centralisers 42, 43 arranged around the power shaft 8, diametrically opposite one another. Each movable centraliser 42, 43 is, for example, a centraliser as described with reference to FIGS. 2 and 3.

Figure 5:
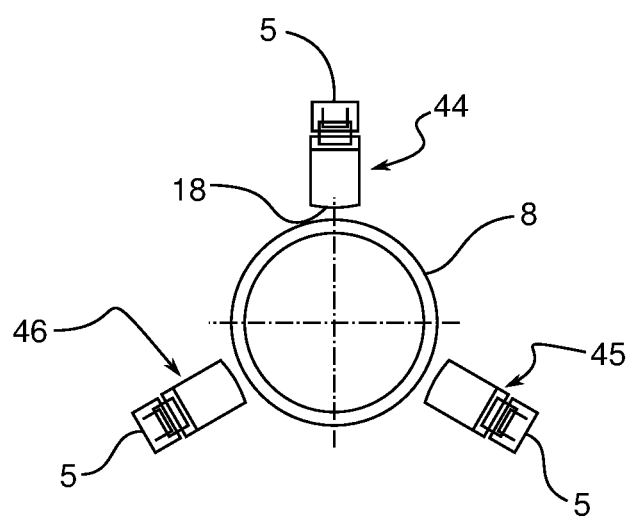
FIG. 5 is a diagrammatic view in cross section of a detail of a turboshaft engine according to an embodiment of the invention equipped with three movable centralisers.

According to another embodiment shown in FIG. 5, the turboshaft engine comprises three movable centralisers 44, 45, 46 distributed uniformly around the power shaft 8 of the free turbine of the turboshaft engine. According to the embodiment shown in FIG. 5, each centraliser is identical to that described with reference to FIGS. 2 and 3, with the exception of the contact surface 18 of each centraliser, which in this embodiment is not concave but convex.

According to other embodiments not shown in the drawings, the turboshaft engine may comprise both concave and convex centralisers.

According to other embodiments not shown in the drawings, the turboshaft engine may comprise more than three movable centralisers distributed around the power shaft.

The invention also relates to a helicopter comprising at least one turboshaft engine according to the invention.

It should also be noted that a movable centraliser of a turboshaft engine according to the invention may advantageously be fitted to a power shaft of an internal combustion engine (with pistons or with a rotor).

It may also be used to connect a gas turbine to a propeller reduction gear of a turboprop engine of an aircraft (fixed-wing).

The invention claimed is:

1. A turboshaft engine comprising a casing in which is arranged a gas generator and a free turbine fitted to a power shaft configured to be mechanically connected to/disconnected from a reduction gearbox,
wherein said turboshaft engine comprises a centraliser movable between an active position, in which the centraliser forms a bearing for said power shaft and which corresponds to a mechanical disconnection between said power shaft and said reduction gearbox, and a passive position, in which the centraliser is distanced from said power shaft and which corresponds to a mechanical connection between said power shaft and said reduction gearbox.

2. The turboshaft engine according to claim 1, wherein the centraliser is configured to pass automatically from said active position to said passive position during connection of said power shaft to said reduction gearbox, and to pass automatically from said passive position to said active position during disconnection of said power shaft from said reduction gearbox.

3. The turboshaft engine according to claim 2, wherein the centraliser comprises a conical guide ramp with an axis parallel to an axis of said power shaft, and correspondingly shaped to a conical portion of said casing so that a sliding of said guide ramp on said conical portion of said casing displaces said movable centraliser relative to said power shaft.

4. The turboshaft engine according to claim 3, further comprising at least one radial spring fitted perpendicularly to said power shaft, between said casing and the movable centraliser, and at least one axial spring extending between said casing and the movable centraliser, said springs being fixed relative to the casing and slideable relative to the movable centraliser, and being configured to exert a resultant force that opposes a spontaneous sliding of said guide ramp on said conical portion of said casing, towards said casing.

5. The turboshaft engine according to claim 4, wherein the centraliser has a stop extending in a plane perpendicularly to the axis of said power shaft opposite a bearing surface of the reduction gearbox, so that the mechanical connection between said power shaft and said reduction gearbox produces a mechanical contact between said bearing surface and said stop that leads, through compression of said springs to said centraliser sliding on said conical portion of said casing, from said active position to said passive position.

6. The turboshaft engine according to claim 1, wherein the centraliser has a concave surface of contact with said power shaft so that the centraliser at least partially surrounds said power shaft in the active position.

7. The turboshaft engine according to claim 1, wherein the turboshaft engine comprises at least two movable centralisers arranged around said power shaft.

8. A helicopter comprising at least one turboshaft engine according to claim 1.

* * * * *

UNITED STATES PATENT AND TRADEMARK OFFICE
CERTIFICATE OF CORRECTION

PATENT NO. : 10,458,341 B2
APPLICATION NO. : 15/568742
DATED : October 29, 2019
INVENTOR(S) : Lafargue et al.

Page 1 of 1

It is certified that error appears in the above-identified patent and that said Letters Patent is hereby corrected as shown below:

On the Title Page

| Column | Line | |
|---|---|---|
| (57) | Abstract | "shaft the reduction gearbox" should read |
| Column 2 | 12 of text | --shaft and the reduction gearbox-- |

Signed and Sealed this
Twelfth Day of May, 2020

Andrei Iancu
*Director of the United States Patent and Trademark Office*